United States Patent [19]

St. Clair et al.

[11] Patent Number: 5,502,156

[45] Date of Patent: Mar. 26, 1996

[54] ELECTRICALLY CONDUCTING POLYIMIDE FILM CONTAINING TIN COMPLEXES

[75] Inventors: Anne K. St. Clair, Poquoson, Va.; Stephen A. Ezzell, Woodbury, Minn.; Larry T. Taylor, Blacksburg; Harold G. Boston, Newport News, both of Va.

[73] Assignee: The United States of America as represented by the Administrator of the National Aeronautics and Space Administration, Washington, D.C.

[21] Appl. No.: 282,849

[22] Filed: Jul. 28, 1994

[51] Int. Cl.$^6$ .............................. C08G 73/10; B05D 5/06; B32B 27/00
[52] U.S. Cl. .................. 528/353; 528/170; 528/172; 528/173; 528/176; 528/183; 528/185; 528/188; 528/271; 528/274; 528/283; 528/310; 427/58; 427/162; 427/407.1
[58] Field of Search ................................. 528/353, 125, 528/126, 128, 172, 185, 188, 271, 274, 283, 310, 170, 176, 173, 183; 427/58, 162, 407.1

[56] References Cited

U.S. PATENT DOCUMENTS

| | | | |
|---|---|---|---|
| 4,895,972 | 1/1990 | Stoakley et al. | 528/353 |
| 5,338,826 | 8/1994 | Clair et al. | 528/353 |

OTHER PUBLICATIONS

Article "Surface–Semiconductor Polyimide Films Containing Tin Complexes" Macromolecules 1984, vol. 17, 1627–1632.

*Primary Examiner*—James J. Seidleck
*Assistant Examiner*—Duc Truong
*Attorney, Agent, or Firm*—George F. Helfrich

[57] ABSTRACT

Disclosed is a thermally-stable $SnO_2$-surfaced polyimide film wherein the electrical conductivity of the $SnO_2$ surface is within the range of about $3.0 \times 10^{-3}$ to about $1 \times 10^{-2}$ ohms$^{-1}$. Also disclosed is a method of preparing this film from a solution containing a polyamic acid and $SnCl_4$ $(DMSO)_2$.

8 Claims, 2 Drawing Sheets

ELECTRICALLY CONDUCTING POLYIMIDE FILM CONTAINING TIN COMPLEXES

ORIGIN OF THE INVENTION

The invention described herein was jointly made by an employee of the United States Government and contract employees during the performance of work under NASA Contract NAS1-19000 and is subject to the provisions of Section 305 of the National Aeronautics and Space Act of 1958, as amended Public Law 85-568 (72 Stat. 435; 42 USC 2457), and during the performance of work under NASA Grant NAG-1-343. In accordance with 35 USC 202, the grantee elected not to retain title.

BACKGROUND OF THE INVENTION

1. Field of the Invention

This invention relates generally to conductive polymers. It relates particularly to semi-conductive tin dioxide-surfaced polyimide films with conductivities in the range of $1.0 \times 10^{-2}$ to $3.0 \times 10^{-3}$ ohm-1 and to the process for their preparation.

2. Description of the Related Art

A need exists in the aerospace industry for flexible, electrically conductive polymeric films and coatings having electrical conductivities in the semi-conducting range for use on large space structures to provide for relief from space-charging, and on advanced aircraft to provide for lightning strike resistance, and other applications. For successful use, these films and coatings should exhibit no significant loss of electrical or mechanical properties during exposure to elevated temperatures, as well as severe weather and other pertinent use conditions.

A procedure for making $SnO_2$ coated polyimide films via incorporation of tin compounds was reported (Taylor, L. T.; and St. Clair, A. K.: *Polyimides*, vol. 2, edited by K. L. Mittal, Plenum Publishing Corp., New York, 1984, pp. 617–645. Ezzell, S. A.; and Taylor, L. T.: *Macromolecules*, vol. 17, 1984, pp. 1627–1632.). Synthesis of these materials involved preparation of a polyamic acid from an aromatic diamine and dianhydride in a polar aprotic solvent, addition of a soluble tin compound (Tin(II) chloride dihydrate or dibutyltin dichloride) to the polyamic acid, preparation of a film, and thermal curing to 300° C. in air. This procedure produced materials with one conductive surface, viz., the side facing up (air side) during thermal curing. These films had an air-side surface conductivity of $4.5 \times 10^{-5}$ ohm$^{-1}$. Characterization of these films revealed the conductive properties to be due to a layer of tin dioxide formed on the surface of the film from migration and decomposition of the tin compound during thermal treatment.

Other researchers in related work (Goldstein, R. D.; Brown, E. M.; and Maldoon, L. C.: Trans. Nucl. Sci, NS-29, 1082, pp. 1621–1628) evaluated polyimide film coated with sputtered indium tin oxide (ITO) for thermal control coating applications. Electrical integrity of the ITO was monitored through abrasion, adhesion, thermal cycling, flexure, and other relevant tests. Test results varied depending on the thickness of the ITO layer, and its subsequent conductivity. A sample measuring $6.04 \times 10^{-3}$ ohm$^{-1}$ exhibited negligible conductivity change after abrasion and adhesion testing. However, flexural testing of the film caused a 60% decrease in conductivity which eliminated its usefulness. Thermal cycling determined the electrical properties of the ITO coating to be stable to 125° C., above which large decreases in electrical conductivity were observed.

It is a primary object of the present invention to produce polyimide films having surface conductivities in the range of $1.0 \times 10^{-2}$ to $3.0 \times 10^{-3}$ ohm$^{-1}$.

Another object of the present invention is to provide a controlled process for the production of polyimide films having surface conductivities in the range of $1.0 \times 10^{-2}$ to $3.0 \times 10^{-3}$ ohm$^{-1}$.

SUMMARY OF THE INVENTION

According to the present invention, the foregoing and additional objects are attained by providing polyimide films made semi-conductive in a desired conductivity range by incorporation of a soluble tin complex into a polyamic acid solution and subsequent fabrication of this solution as a film under careful processing conditions. This film has one semi-conductive surface, due to a chemically formed layer of $SnO_2$. The $SnO_2$ is formed from the tin complex that has been solvated in the precursor polyamic acid, which during the thermal curing process migrates to the surface of the film and is chemically converted to $SnO_2$. This $SnO_2$ layer is intimately bound to the polyimide film and cannot be removed without destroying the semi-conductive properties of the film. By careful control of processing conditions (solution preparation, film preparation, thermal curing), film surface conductivities of about $1.0 \times 10^{-2}$ to $3.0 \times 10^{-3}$ ohm$^{-1}$ have been obtained. See Table 1 below. Film volume conductivities were not appreciably effected by tin complex addition. The surface semi-conductive polyimide films according to the present invention all possess excellent thermal stability, with polymer decomposition temperatures greater than 500° C. See Table 2 below. Incorporation of the tin complexes was therefore determined not to substantially affect the excellent elevated temperature properties of the polyimide.

TABLE 1

Conductivity values of PMDA/4,4'-ODA $SnO_2$-surfaced films.

| Film Sample | Molar Ratio Additive:Polyimide | Film Thickness mil | Film Mean Conductivity, ohm$^{-1}$ ($\times 10^{-2}$) | | | |
|---|---|---|---|---|---|---|
| | | | Initial[a] | % Deviation | After Tape Test | After Flex[b] Test |
| 1 | 0.75:4.00 | 1.4 | 1.07 | 10.0 | 1.07 | <0.04 to 0.69 |
| 2 | 0.75:4.00 | 1.3 | 1.02 | 3.2 | 1.02 | <0.04 to 0.76 |
| 3 | 0.75:4.00 | 1.3 | 1.11 | 2.8 | 1.12 | <0.04 |
| 4 | 0.75:4.00 | 1.9 | 0.50 | 15.0 | 0.50 | <0.04 to 0.39 |
| 5 | 0.50:4.00 | 1.5 | 0.04 | 31.0 | — | — |
| 6 | 1.00:4.00 | 0.9 | 0.31 | 4.2 | — | — |

TABLE 1-continued

Conductivity values of PMDA/4,4'-ODA SnO$_2$-surfaced films.

| Film Sample | Molar Ratio Additive:Polyimide | Film Thickness mil | Film Mean Conductivity, ohm$^{-1}$ ($\times 10^{-2}$) | | | |
|---|---|---|---|---|---|---|
| | | | Initial[a] | % Deviation | After Tape Test | After Flex[b] Test |
| 7 | control | — | non-conducting | | — | — |

[a]Film still attached to glass plate
[b]Film removed from glass plate

TABLE 2

Thermal properties of PMDA/4,4'-ODA SnO$_2$-surfaced films.

| Film Sample | Molar Ratio Additive:Polyimide | Tg, °C. | PDT, °C. | % Tin Found | % Tin Theoretical |
|---|---|---|---|---|---|
| 1 | 0.75:4.00 | 412 | 534 | 5.20 | 5.42 |
| 2 | 0.75:4.00 | — | 550 | 5.08 | 5.42 |
| 3 | 0.75:4.00 | — | 525 | 5.21 | 5.42 |
| 4 | 0.75:4.00 | — | 525 | 5.03 | 5.42 |
| 5 | 0.50:4.00 | 365 | 555 | 3.37 | 3.71 |
| 6 | 1.00:4.00 | 320 | 520 | 6.31 | 7.05 |
| 7 | control | 405 | 580 | — | — |

BRIEF DESCRIPTION OF THE DRAWINGS

For a more complete understanding of the present invention, including its primary objects and attending benefits, reference should be made to the Description of the Preferred Embodiments, which is set forth in detail below. This Detailed Description should be read together with the attached drawings, wherein.

DESCRIPTION OF THE PREFERRED EMBODIMENTS

The process for producing a semi-conductive, SnO$_2$-surfaced polyimide film according to the present invention involves the following steps:

(1) provision of the tin complex SnCl$_4$ (DMSO)$_2$, which is soluble in the solvent of choice for a polyamic acid to be processed into the desired polyimide film; (2) preparation of the polyamic acid solution; (3) addition of the soluble tin complex with mixing until the solution is homogeneous; (4) spreading of the solution as a film on a rigid substrate; (5) thermal treatment to imidize the polymer, induce migration of tin complex to the film surface, and convert the tin complex to inert, semi-conductive SnO$_2$. Steps (2) and (3) may be interchanged; i.e., the tin complex may be first dissolved and polymerization conducted in the presence of the complex.

If the SnO$_2$-surfaced polyimide is to be used as a free-standing film (i.e., released from its rigid substrate, it is necessary to topcoat the semi-conductive layer with another layer of polyimide, deposited as a film from solution directly onto the SnO$_2$. This is necessary to protect the electrical integrity of SnO$_2$, which otherwise can be altered via mechanical flexing. Although the SnO$_2$ layer is tightly bound to the polyimide substrate, it can be fractured easily because of its inherent brittleness, causing electrical discontinuities. The method of the present invention for topcoating the SnO$_2$-surfaced polyimide film alleviates this problem.

Solvents used in the synthesis of polyamic acids are polar, aprotic solvents such as N,N-dimethylacetamide, N-methylpyrrolidone, and 2-dimethoxyethylether. It was found that the tin complex employed in this invention was soluble in these solvents (required solubility is about 0.1 g in 1 mL).

The tin complex used in the specific examples which follow is SnCl$_4$(DMSO)$_2$, wherein DMSO is dimethylsulfoxide. This complex is readily converted to SnO$_2$ under conditions of polyimide preparation, namely hydrolysis and elevated temperature.

Figure 1:
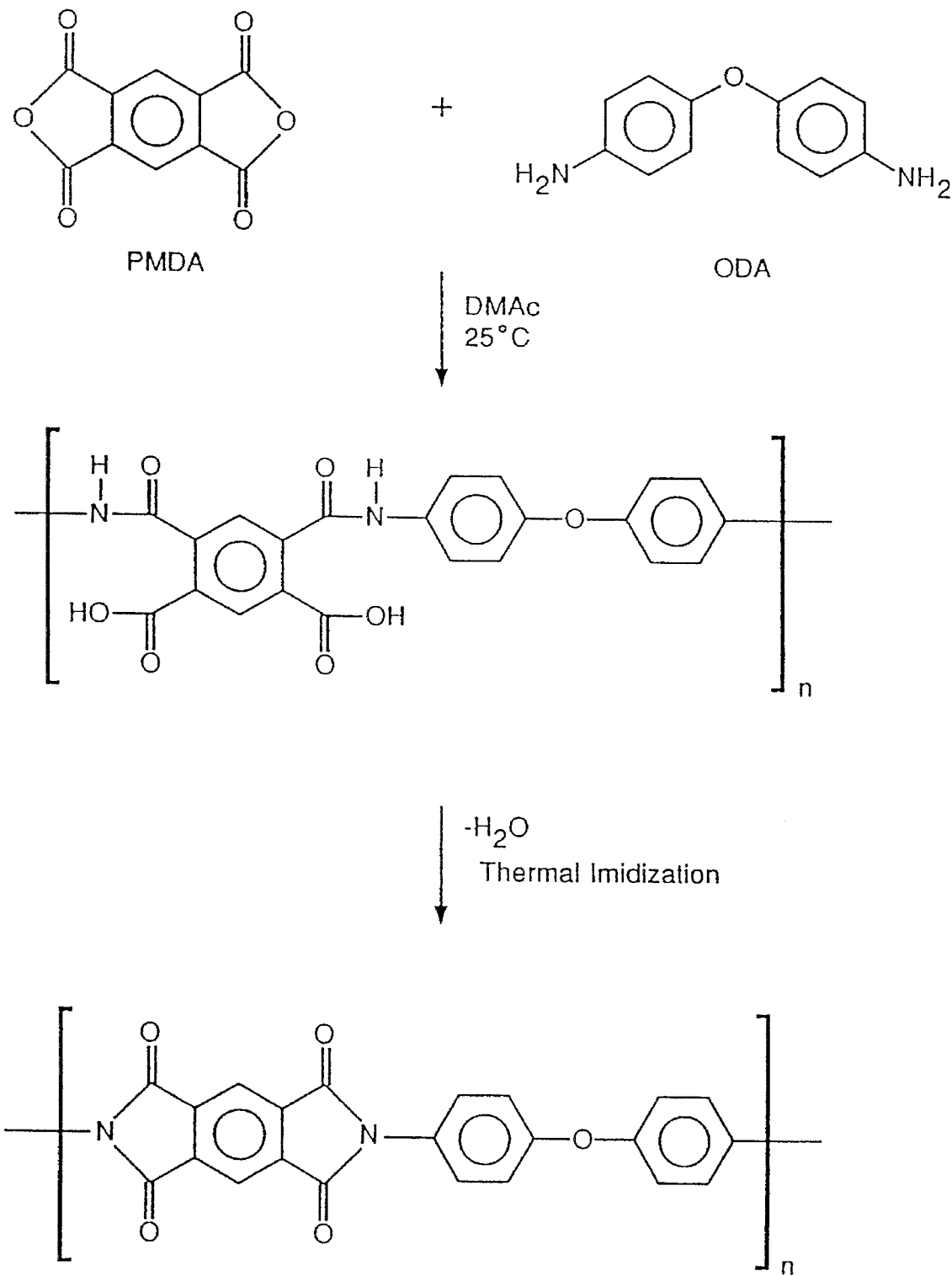
FIG. 1 is an equation representing the reaction route for preparing a polyimide which has been rendered semi-conductive according to the present invention. This polyimide results from the reaction of pyromellitic dianhydride (PMDA) and 4,4'-oxydianiline ((ODA).

Although the polyimide system derived from the preparation of 4,4'-ODA with PMDA (FIG. 1 ) has been rendered semi-conductive in the examples herein, other polyimide systems can also be used. The thermal preparation conditions listed have been optimized for the specific polymer system, percent solids concentration, and film thicknesses given as examples. Other thermal preparation conditions may be required as these parameters are varied.

It should be noted that control polyimide films, i.e., PMDA/4,4'-ODA containing no tin complex, were prepared and their thermal and electrical properties evaluated. The polyimide films containing no tin complex are electrically nonconductive.

Figure 2:
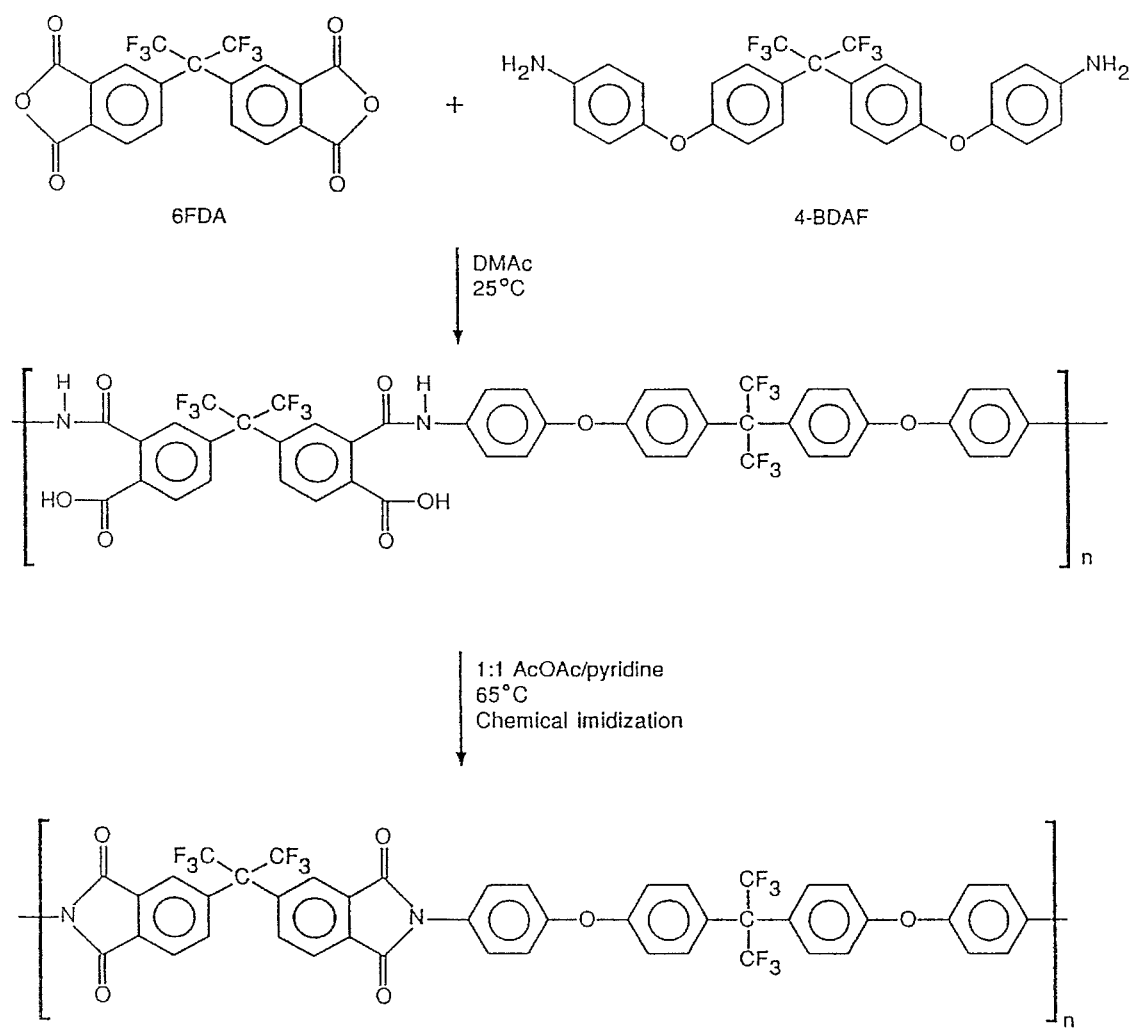
FIG. 2 is an equation representing the reaction route for preparing a polyimide which is employed as a top coat or protective coating for protecting the semi-conducting film surface according to the present invention. This polyimide results from the reaction of 2,2-bis(3,4-dicarboxyphenyl)hexafluoropropane dianhydride (6FDA) and 2,2-bis[4-(4-aminophenoxy)phenyl] hexafluoropropane (4-BDAF).

Although the system used as a top-coat in this invention was the 6FDA/4-BDAF polymer displayed in FIG. 2, any protective coating could be used to protect the conducting film surface as long as it is flexible and has good adhesion to the oxide surface layer.

SPECIFIC EXAMPLES

Example 1

Starting materials for the preparation of polyamic acid PMDA/4,4'-ODA containing the tin complex SnCl$_4$(DMSO)$_2$ were as follows: 4,4'-oxydianiline (ODA, FIG. 1) was obtained from commercial sources, recrystallized from an ethanol and water mixture, and sublimed at 185° C. with less than 1 torr pressure. Pyromellitic dianhydride (PMDA, FIG. 1) was obtained from commercial sources and sublimed at 215° C. SnCl$_4$(DMSO)$_2$ was prepared from a procedure known to those of skill in the art.

N,N-dimethylacetamide (DMAc) was obtained from commercial sources in a greater than 99.5% pure form and used as received.

Preparation of polyamic acid resin PMDA/4,4'-ODA containing the tin complex $SnCl_4(DMSO)_2$ was performed at room temperature in a 300 mL resin bottle, equipped with a mechanical stirrer, nitrogen ($N_2$) inlet, and bubbler. The resin kettle was first charged with 12.92 g (0.0645 moles) 4,4'-ODA and 100 mL DMAc, then stirred. After the ODA dissolved (about 30 minutes), 14.08 g (0.0645 moles) PMDA was added with 50 mL DMAC. Stirring was maintained at 500 rpm, and a $N_2$ atmosphere was maintained throughout the reaction. Viscosity of the solution was noted to begin increasing rapidly with the addition of PMDA. DMAc (41 mL) was added over the next 30 minutes. The $SnCl_4(DMSO)_2$ (5.04 g, 0.0121 moles) was then weighed into a pan, dissolved in DMAc, and added to the reactor with the remainder of the solvent; a total of 45 mL of DMAc was added at this time. About 35 minutes later, the stirring speed was reduced to 250 rpm. Stirring of the solution was allowed to continue overnight, for a total stirring time of about sixteen hours. This example results in the preparation of a PMDA/4,4'-ODA polyamic acid resin containing $SnCl_4(DMSO)_2$, which is suitable for the preparation of polyimide films or coatings which possess a semi-conductive surface according to the present invention. This resin contains 10.9% solids in DMAC. A 0.75:4:00 stoichiometric ratio is present of $SnCl_4(DMSO)_2$ to the polyamic acid repeating unit. Four preparations were conducted under the previous conditions and produced solutions with inherent viscosities of 1.75, 1.87, 1.65, and 1.42 dL/g. These variations were ascribed to minute differences in monomer purity and reaction conditions from batch to batch. All four preparations were useful for preparing polyimides having a semi-conductive surface according to the present invention.

Example 2

A PMDA/4,4'-ODA polyamic acid resin prepared as described in Example 1, having an inherent viscosity of 1.75 dL/g, was converted into a film as follows: The resin was centrifuged for 30 minutes at 1200 rpm. A 16"×24" soda-lime glass plate was cleaned with scouring powder, rinsed sequentially with water, cleaned with ethanolic potassium hydroxide, and rinsed sequentially with water, acetone, ethanol, and finally allowed to dry. The resin (52.6 g) was poured onto the glass plate. The solution was spread as a film by pulling the plate under a 17" doctor blade which was set at a blade gap of 28 mil. An electric motor was used to pull the plate at an even speed. The film spreading procedure was performed in a chamber having a relative humidity of 21%. Immediately after the film was spread, the plate was removed from the chamber and placed in a forced air oven. The polyamic acid film was then cured to the polyimide by the following thermal treatment:

20 minutes at 60° C.
10 minutes at 80° C.
60 minutes at 100° C.
60 minutes at 200° C.
60 minutes at 300° C.

The film was left in the oven to cool to ambient temperature overnight.

The resulting material was a clear brownish film about 48 square inches, with a thickness of 1.4 mil. The surface of the film was semi-conductive, with a measured conductivity of $1.07 \times 10^{-2}$ $ohm^{-1}$. This value is the average from 15 measurements taken across the surface of the film. The under side of the film was nonconductive. The bulk of this film was also determined to be nonconductive. Elemental analysis revealed that this film contained 5.20% tin. Thermal analysis of this material determined its softening temperature (Tg) to be 321° C. Its polymer decomposition temperature (PDT) was determined to be 534° C. (2.5° C./minute, heating in air), indicating excellent thermal stability.

The film preparation method of this Example, when performed with a solution prepared as described in Example 1, yields a brown polyimide film which has one semi-conductive surface. The semi-conductive surface is the side of the film which was exposed to air during thermal curing ("air side"). The surface conductivity of this semi-conductive surface was unaffected by either the standard tape test (attaching and removing a piece of tape) or mild abrasion. This indicated good adhesion of the surface conductive material to the polyimide substrate.

Example 3

The resin described in Example 1 was also used in this preparation. First, the resin (which had been stored in a freezer) was allowed to warm for 30 minutes at room temperature. It was then centrifuged for 30 minutes at 1200 rpm. A film was then prepared from this resin, following the procedure described in Example 2.

The resulting brown film had a light blue haze on its air side and was about 48 square inches, with a film thickness of 1.3 mil. The air-side surface conductivity of this material was $1.02 \times 10^{-2}$ $ohm^{-1}$ (averaged from measurements of 15 areas). Surface conductivity was unaffected by the tape test. The film was determined to contain 5.08% tin.

Example 4

A resin prepared as in Example 1 having an inherent viscosity of 1.87 dL/g was used for film preparation in this example. The resin was allowed to warm to room temperature for one hour, then centrifuged for 30 minutes at 1200 rpm. The resin (35.9 g) was used to make a film closely following the procedure of Example 2.

The resulting brown film was about 36 square inches in size and 1.3 mil thick. The air side conductivity was measured to be $1.11 \times 10^{-2}$ $ohm^{-1}$ (averaged from 11 areas). Surface conductivity was unaffected by the tape test, demonstrating good adhesion of the semi-conductive surface to the polyimide film. The film contained 5.21% tin.

Example 5

A resin prepared as in Example 1 having an inherent viscosity of 1.42 dL/g was used for film preparation in this Example. The resin was allowed to warm at room temperature 1.2 hours then centrifuged for 30 minutes at 1200 rpm. The resin (45.9 g) was used to make a film under the conditions described in Example 2.

The film produced was brown with a blue haze on part of the surface. This material was about 25 square inches in size, and had a thickness of 1.9 mil. Air side surface conductivity was measured to be $4.97 \times 10^{-3}$ $ohm^{-1}$ (averaged from 10 areas). In this particular preparation it was discovered after-the-fact that a glass plate with uneven surface was used, causing variances in film thickness, and correspondingly, somewhat larger relative deviation in surface conductivity. This example indicated that some control of surface conductivity is possible, by alteration of film thickness. Increasing thickness in this Example (compared to Examples 3 and 4) allowed a material of lower conductivity to be prepared. As in previous Examples, the glass side and bulk of this film were determined to be nonconductive. This film contained 5.03% tin.

Example 6

A PMDA/4,4'-ODA polyamic acid resin containing $SnCl_4(DMSO)_2$ was prepared as in Example 1 except that 3.36 g $SnCl_4(DMSO)_2$ (0.0081 moles) was used, yielding a preparation having a tin complex to polyamic acid repeating unit of 0.50:4.00. This solution was prepared to demonstrate the effect of tin complex concentration in the polyamic acid resin upon surface conductivity of the subsequent $SnO_2$-surfaced polyimide film.

Example 7

A PMDA/4,4'-ODA polyamic acid containing $SnCl_4(DMSO)_2$ was prepared as in Example 1 except that 7.72 g of $SnCl_4(DMSO)_2$ (0.0161 moles) was used, yielding a preparation having a tin complex to polyamic acid repeat unit of 1.00:4.00. This solution as prepared for the same reasons as Example 6.

Example 8

The resin described in Example 6 was used to prepare a tin-containing film following the procedure of Example 2. The resulting brown polyimide film had an air side surface conductivity of $4.12 \times 12^{-4}$ $ohm^{-1}$ (averaged from 12 areas). As in previous examples, this film exhibited no glass side or volume conductivity. This example demonstrated alteration of surface conductivity of the polyimide film is possible by lowering the concentration of $SnCl_4(DMSO)_2$.

Example 9

The resin described in Example 7 was used to prepare a tin-containing film following the procedure of Example 2. The resulting brown film had a non-homogeneous multicolored surface which could be wiped off fairly easily, unlike films prepared in the previous examples. Surface conductivity of this material (air side) was measured to be $3.10 \times 10^{-3}$ $ohm^{-1}$ (averaged from 10 areas). This conductivity could be greatly effected by light rubbing or by the tape test, unlike films of previous examples, indicating, in this instance, poor adhesion of the $SnO_2$ layer to the polyimide film substrate. This Example indicates an optimum concentration of $SnCl_4(DMSO)_2$ is necessary to produce an $SnO_2$ surface on polyimide with good adhesion properties, and conductivities in the ranges desired. The concentration of $SnCl_4(DMSO)_2$ in this example was too high for good adhesion properties.

Example 10

A PMDA/4,4'-ODA polyamic acid resin was prepared as described in example 1, except in this preparation no $SnCl_4(DMSO)_2$ was added. This resin was used to prepare a PMDA/4,4'-ODA polyimide film for reasons of comparison.

Example 11

Using the procedure of Example 2, a PMDA/4,4'-ODA polyimide film was prepared from the resin of Example 10. This film contained no tin, and was prepared for comparison. This clear yellow film exhibits a softening temperature of 405° C., and a polymer decomposition temperature of 580° C. The air side, glass side, and bulk of the film were all nonconductive.

Example 12

This example describes a method for protecting the $SnO_2$ surface of the polyimide films prepared according to the present invention. This method is provided to preserve the semi-conductive properties of the $SnO_2$ surface. For example, after removing the polyimide film of Example 2 from the glass plate, its surface conductivity was remeasured and found to have varied between $<4.5 \times 10^{-4}$ and $8.19 \times 10^{-3}$ $ohm^{-1}$. This significant alteration in surface conductivity is attributed to cracking of the brittle $SnO_2$ surface layer upon flexure of the polyimide film. Electrical discontinuity of the $SnO_2$ surface layer results, leading to higher measured conductivities for the film surface.

Coating of the $SnO_2$ surface was performed to protect the integrity of the $SnO_2$ surface as follows: A film was prepared following the general procedure of Example 2 and measured to have a surface conductivity of $6.75 \times 10^{-3}$ $ohm^{-1}$. While this film remained on the glass plate, it was coated with a solution of a soluble polyimide (2,2-bis(3,4-dicarboxyphenyl)hexafluoropane dianhydride/2,2-bis[4-(4-aminophenoxy)phenyl]hexafluoropropane, 8% w/w) in chloroform ($CHCl_3$) with a doctor blade at a 24 mil blade gap. After top-coating, the film was left at ambient temperature for 45 minutes, then heated at 100° C. for one hour, to evaporate the $CHCl_3$.

The resulting material was removed from the glass plate and its conductivity measured. Removal of the film from the glass plate was seen to have no effect on the conductivity of this coated film. The coated film was then flexed at 180° several times in an effort to disrupt the continuity of the $SnO_2$ layer. The conductivity was essentially unchanged. Therefore it is evident that coating the $SnO_2$ surface with a polyimide layer as described in this Example provides a more electrically stable and durable material, making it more valuable for certain applications.

The present invention has been described in detail with respect to certain preferred embodiments thereof. As is understood by those of skill in the art, variations and modifications in this detail may be made without any departure from the spirit and scope of the present invention, as defined in the hereto-appended claims.

We claim:

1. A process for preparing a thermally-stable $SnO_2$-surfaced polyimide film wherein the electrical conductivity of the $SnO_2$ surface is within the range of about $3.0 \times 10^{-3}$ to about $1 \times 10^{-2}$ $ohms^{-1}$, which process comprises:

preparing a polyamic acid solution by reacting a diamine and a dianhydride in a polar aprotic solvent;

adding $SnCl_4$ $(DMSO)_2$ to the polyamic acid solution to produce a homogeneous admixture;

spreading the homogeneous admixture as a film on a rigid substrate; and thermally treating the film of the homogeneous admixture to imidize the polyamic acid to a polyimide and at the same time induce migration of the $SnCl_4$ $(DMSO)_2$ to the surface of the film of the homogeneous admixture, where the $SnCl_4$ $(DMSO)_2$ is converted to $SnO_2$.

2. A process for preparing a thermally-stable $SnO_2$-surfaced polyimide film wherein the electrical conductivity of the $SnO_2$ surface is within the range of about $3.0 \times 10^{-3}$ to about $1 \times 10^{-2}$ $ohms^{-1}$, which process comprises:

dissolving $SnCl_4 (DMSO)_2$ in a polar aprotic solvent;

preparing a polyamic acid solution by reacting a diamine and a dianhydride in the polar aprotic solvent containing the dissolved $SnCl_4 (DMSO)_2$;

spreading the polyamic acid solution as a film on a rigid substrate; and thermally treating the film of the polyamic acid solution to imidize the polyamic acid to a polyimide and at the same time induce migration of the $SnCl_4 (DMSO)_2$ to the surface of the film of the polyamic acid solution where the $SnCl_4 (DMSO)_2$ is converted to $SnO_2$.

3. The process of claim 1, wherein the diamine is 4,4'-oxydianiline, and the dianhydride is pyromellitic dianhydride.

4. The process of claim 2, wherein the diamine is 4,4'-oxydianiline, and the dianhydride is pyromellitic dianhydride.

5. The process of claim 1, wherein the stoichiometric ratio of $SnCl_4 (DMSO)_2$ to the polyamic acid repeating unit is between 0.5:4.00 and 0.75:4.00.

6. The process of claim 2, wherein the stoichiometric ratio of $SnCl_4 (DMSO)_2$ to the polyamic acid repeating unit is between 0.5:4.00 and 0.75:4.00.

7. The process of claim 1, which additionally comprises the step of coating the $SnO_2$ with a protective film.

8. The process of claim 2, which additionally comprises the step of coating the $SnO_2$ with a protective film.

\* \* \* \* \*